(12) United States Patent
Kobayashi

(10) Patent No.: US 10,592,180 B2
(45) Date of Patent: Mar. 17, 2020

(54) INFORMATION PROCESSING DEVICE, INFORMATION PROCESSING METHOD, AND RECORDING MEDIUM

(71) Applicant: Hiroto Kobayashi, Brentford (GB)

(72) Inventor: Hiroto Kobayashi, Brentford (GB)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/282,729

(22) Filed: Feb. 22, 2019

(65) Prior Publication Data

US 2019/0286398 A1    Sep. 19, 2019

(30) Foreign Application Priority Data

Mar. 19, 2018    (JP) .................. 2018-050896

(51) Int. Cl.
*G06F 3/12*    (2006.01)

(52) U.S. Cl.
CPC .......... *G06F 3/1262* (2013.01); *G06F 3/1206* (2013.01); *G06F 3/1253* (2013.01); *G06F 3/1285* (2013.01)

(58) Field of Classification Search
USPC ........................................ 358/1.15
See application file for complete search history.

(56) References Cited

U.S. PATENT DOCUMENTS

| | | | | |
|---|---|---|---|---|
| 2005/0179926 A1* | 8/2005 | Nishikawa | ............ | G06F 3/1205 358/1.13 |
| 2011/0013214 A1* | 1/2011 | Kaida | .................. | G06F 3/1205 358/1.13 |
| 2014/0355026 A1* | 12/2014 | Moribayashi | ......... | G06F 3/1262 358/1.13 |
| 2016/0292543 A1* | 10/2016 | Oishi | ................. | H04N 1/00938 |
| 2018/0143794 A1 | 5/2018 | Kobayashi | | |

FOREIGN PATENT DOCUMENTS

| | | |
|---|---|---|
| JP | 2010-026924 | 2/2010 |
| JP | 2011-134088 | 7/2011 |
| JP | 2013-239204 | 11/2013 |

* cited by examiner

*Primary Examiner* — Ibrahim Siddo
(74) *Attorney, Agent, or Firm* — Harness, Dickey and Pierce, P.L.C.

(57) ABSTRACT

An information processing device includes processing circuitry to: determine whether data to be printed is to be a target to be combined; accumulate in a memory the data to be printed determined to be the target to be combined; combine the accumulated data to be printed to generate combined data in response to a print request, the combined data including combined information indicating that the data to be printed has been combined; generate print data from the combined data; and transmit the print data determined to be the target to be combined to a printing device.

20 Claims, 16 Drawing Sheets

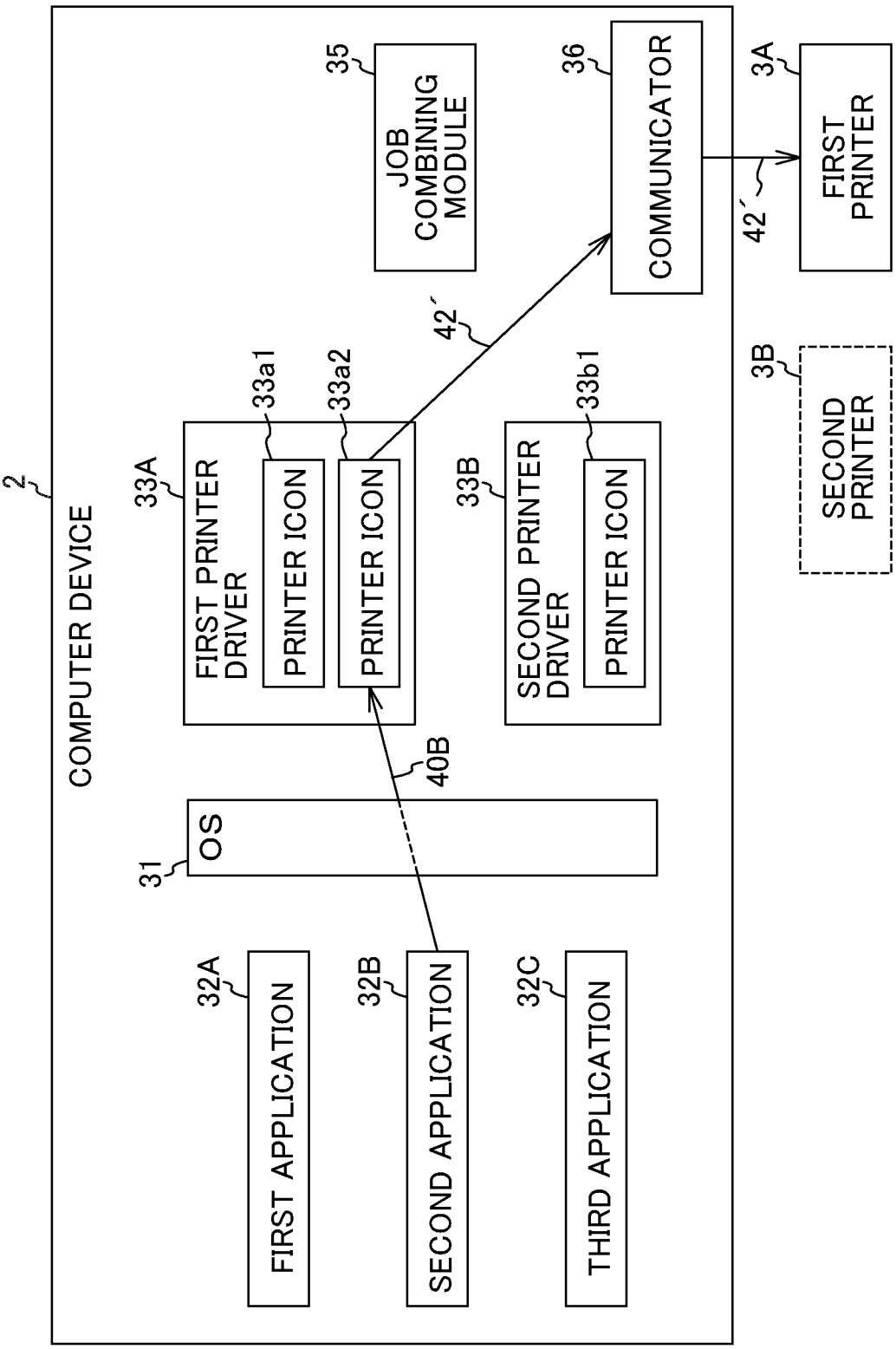

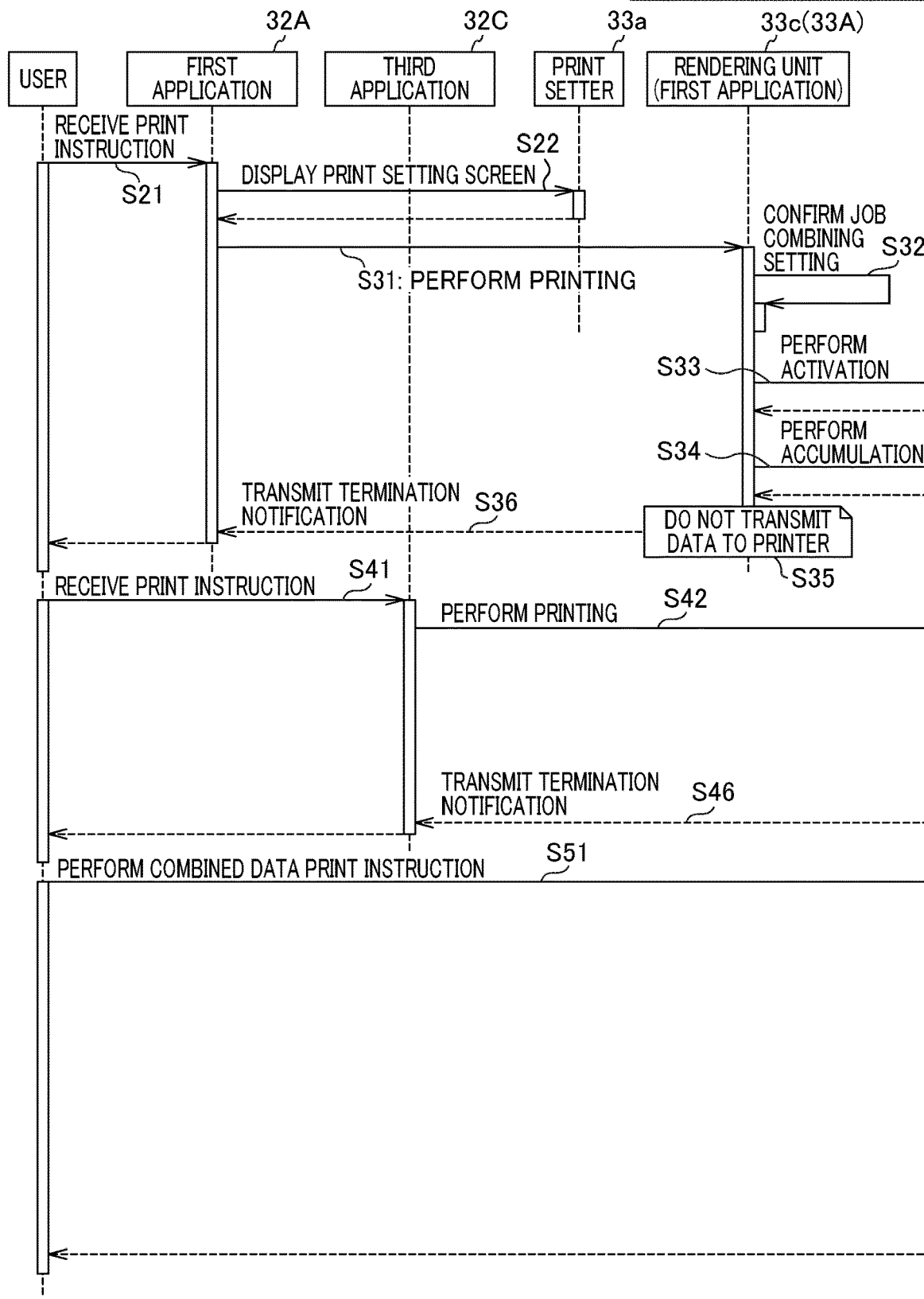

INFORMATION PROCESSING DEVICE, INFORMATION PROCESSING METHOD, AND RECORDING MEDIUM

CROSS-REFERENCE TO RELATED APPLICATIONS

This patent application is based on and claims priority pursuant to 35 U.S.C. § 119(a) to Japanese Patent Application No. 2018-050896, filed on Mar. 19, 2018, in the Japan Patent Office, the entire disclosure of which is hereby incorporated by reference herein.

BACKGROUND

Technical Field

The present invention relates to an information processing device, an information processing method, and a recording medium.

Discussion of the Background Art

Some information processing devices combine a plurality of job data and transmit print data based on the combined job data to a printing device for printing. For example, in a case of collectively printing job data generated by a plurality of types of applications, the plurality of job data is combined into one data and printed.

Conventionally, a job data combining function has been implemented using a port monitor (a module interposed between an operating system and a printer and controlling transmission and reception of data), which can expand functions by a printer vender. For example, the job data combining function has been implemented by setting the port monitor unique to the printer vendor.

However, the port monitor unique to the printer vendor cannot be set in some cases due to limitations of the operating system (hereinafter referred to as OS), so there is a disadvantage that the job data combining function cannot be implemented.

SUMMARY

Example embodiments of the present invention include an information processing device including processing circuitry to: determine whether data to be printed is to be a target to be combined; accumulate in a memory the data to be printed determined to be the target to be combined; combine the accumulated data to be printed to generate combined data in response to a print request, the combined data including combined information indicating that the data to be printed has been combined; generate print data from the combined data; and transmit the print data determined to be the target to be combined to a printing device.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 14 is a diagram for describing a flow of processing in a case of not combining XPS data;

FIGS. 15A and 15B (FIG. 15) illustrate a sequence diagram of print processing in a case of combining XPS data;

Figure 1:
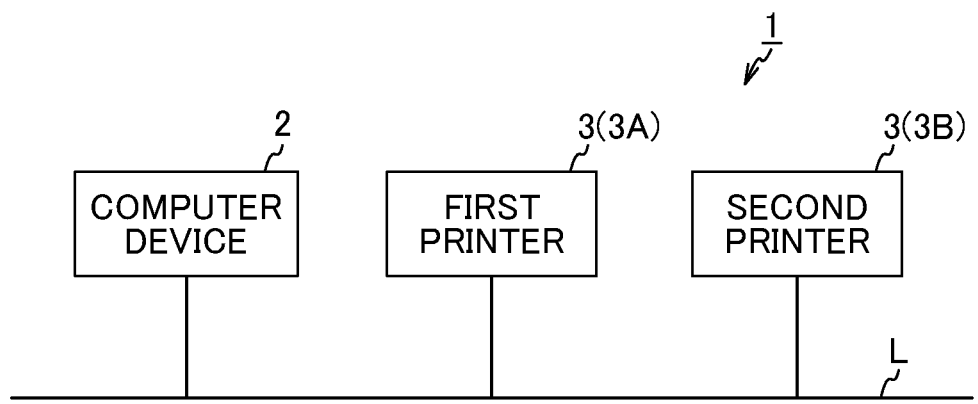
FIG. 1 is a general arrangement diagram of a printing system according to an embodiment of the present invention.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

<Configuration of Printing System>

FIG. 1 is a general arrangement diagram of a printing system 1 according to an embodiment of the present invention. The printing system 1 exemplarily illustrated in FIG. 1 includes a computer device (information processing device) 2 and a printer (printing device) 3. The printer 3 includes a first printer 3A and a second printer 3B that is different from the first printer 3A. In the printing system 1, the computer device 2 and the printer 3 are communicatively connected via a communication line L.

The computer device 2 can perform printing using the printer 3 connected via the communication line L. The computer device 2 will be described below.

The printer 3 is a device that performs printing based on print data transmitted from the computer device 2 and is an example of a printing device. As a printing method of the printer 3, various printing methods including an inkjet method and an electrophotographic method are used. In the present embodiment, the printer 3 is described as an example of an image forming device, but the image forming device is not limited to the printer 3. The image forming device includes various devices having a printing function such as a facsimile device, a copying machine, and a multifunction peripheral, in addition to the printer 3.

The communication line L is an information communication network including the Internet and a local area network, and may be a wired or wireless line.

<Computer Device>

Figure 2:
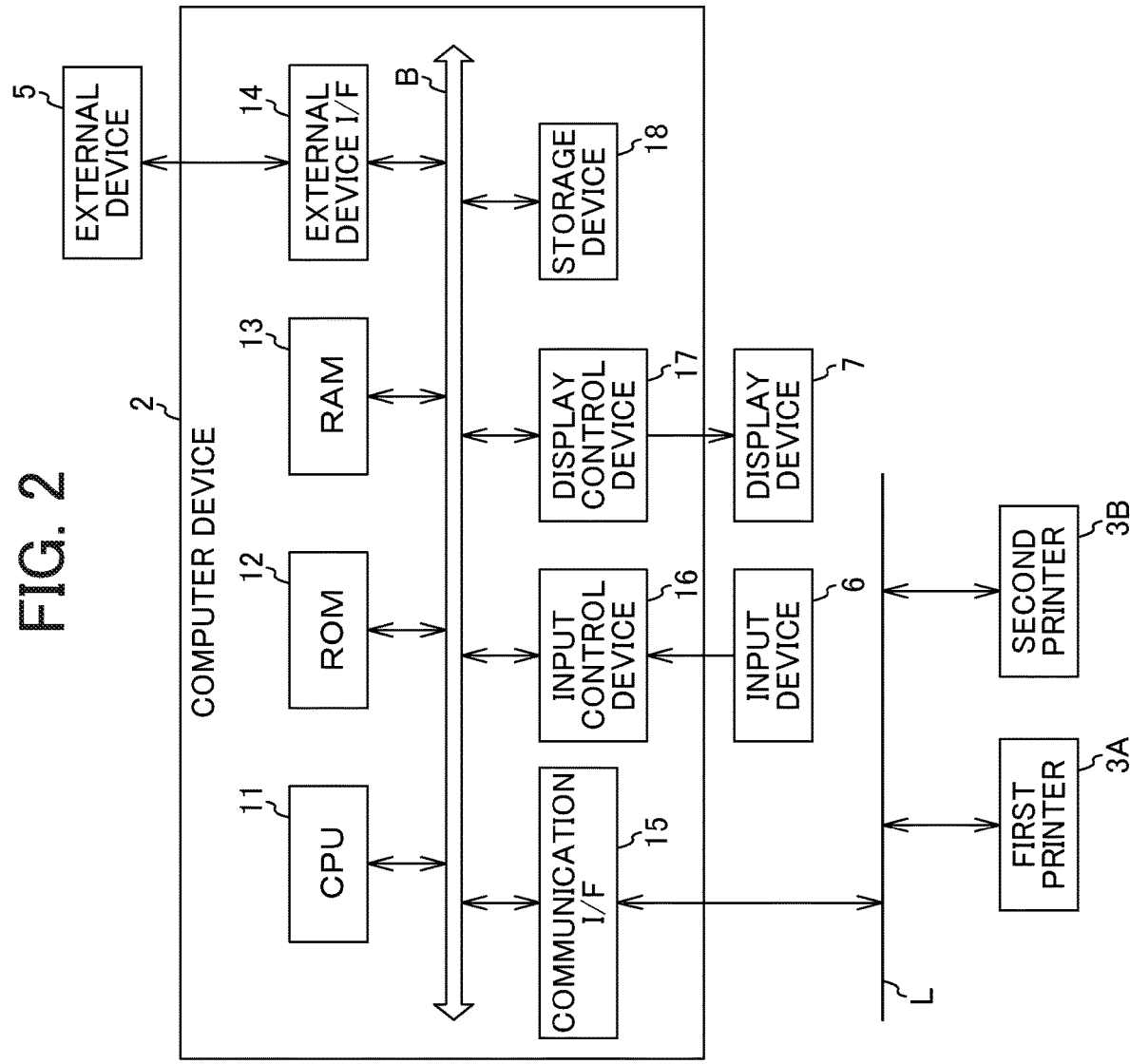
FIG. 2 is a hardware configuration diagram of a computer device included in the printing system according to the embodiment of the present invention.

FIG. 2 is a hardware configuration diagram of the computer device 2 included in the printing system 1 according to the embodiment of the present invention.

As illustrated in FIG. 2, the computer device 2 has a similar configuration to a general information processing terminal. That is, the computer device 2 according to the present embodiment includes a central processing unit (CPU) 11, a read only memory (ROM) 12, a random access memory (RAM) 13, an external device interface (I/F) 14, a communication interface (I/F) 15, an input control device 16, a display control device 17, and a storage device 18. These units are connected to be able to transmit and receive information via a bus B.

The CPU 11 is an arithmetic unit and controls an overall operation of the computer device 2. The ROM 12 is a read only non-volatile storage medium and stores a computer program (hereinafter referred to as a program) such as firmware. The RAM 13 is a volatile storage medium capable of high-speed reading and writing of information and is used as a work area when the CPU 11 processes information.

The external device I/F 14 is an interface for communication with an external device 5. The external device 5 is, for example, a device that writes information to a storage medium or reads information from a storage medium. Examples of the storage medium includes a flexible disk, a flash memory, an optical disk, and a hard disk drive. The CPU 11 can read and write information from and to the storage medium via the external device I/F 14.

The communication I/F 15 is an interface for being connected to the communication line L. The communication I/F 15 may just be connected to the communication line L. For example, a wired local area network (LAN) interface compatible with 10Base-T, 100Base-TX, or 1000Base-T, or a wireless LAN interface compatible with 802.11a/b/g/n is used.

An input device 6 is connected to the input control device 16. The input device 6 is, for example, a keyboard or a mouse, and outputs an operation signal according to an input operation by a user. The input control device 16, which is an interface to the input device 6, receives an input signal output from the input device 6.

A display device 7 is connected to the display control device 17. The display device 7 is a device that displays various types of images and is a liquid crystal display, for example. The CPU 11 can receive print setting from the user or receive a print execution request operation via a visual user interface displayed on the display device 7. The display control device 17, which is an interface to the display device 7, outputs a display signal according to an image to be displayed on the display device 7 to the display device 7.

Figure 3:
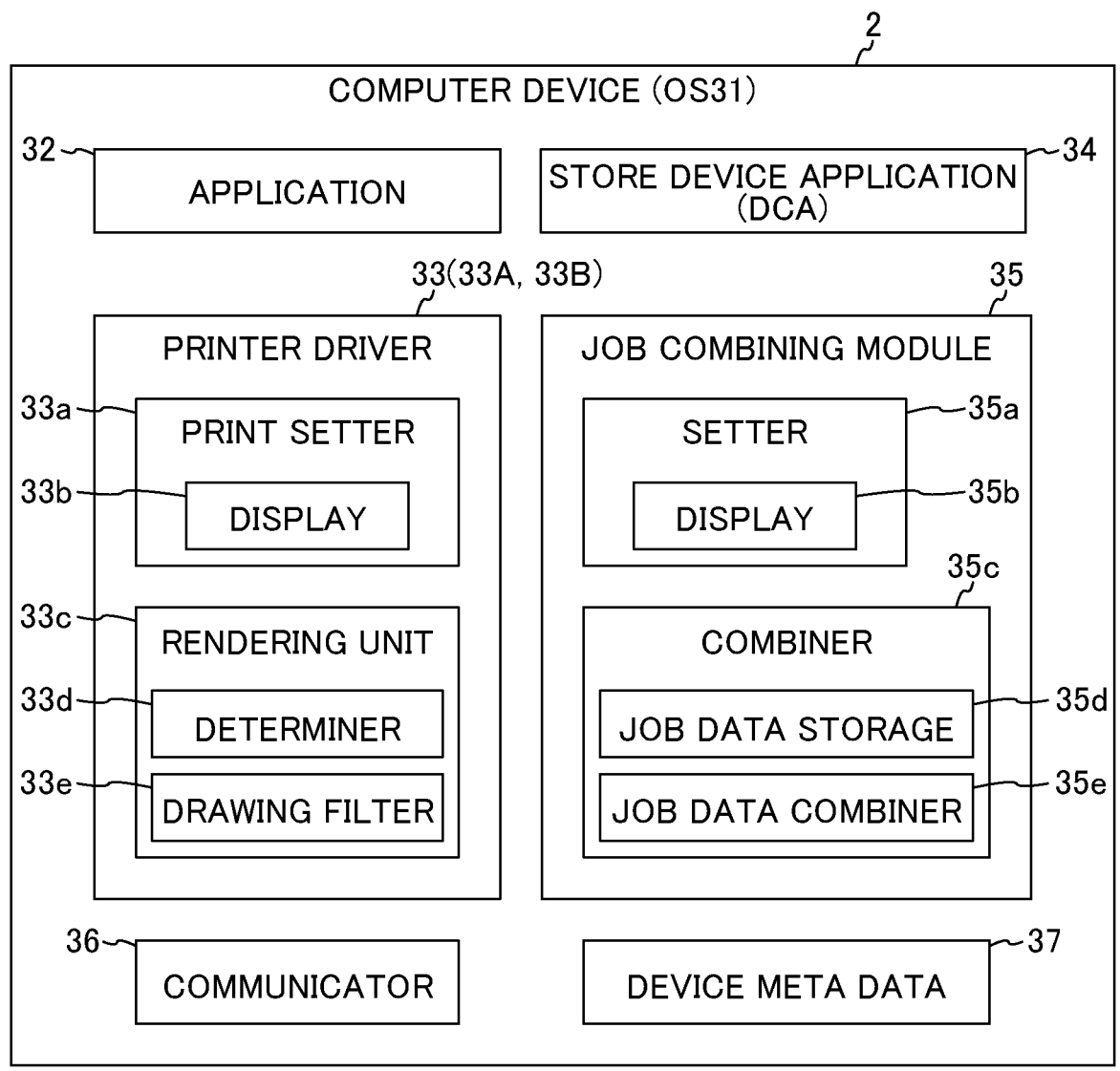
FIG. 3 is a functional block diagram of the computer device according to the embodiment of the present invention.

The storage device 18 is a non-volatile storage medium capable of reading and writing information, such as a hard disk drive device, and stores various programs of an operating system (OS) 31 illustrated in FIG. 3, an application 32, a printer driver 33, a store device application 34, a job combining module 35, and the like. These programs are provided by being recorded in a storage medium, or distributed by being downloaded from a software distribution server via the communication line L.

Note that the OS 31 in the present embodiment is Windows (registered trademark, the same applies to the following description) of Microsoft (registered trademark, the same applies to the following description). Further, functions implemented by the various programs stored in the storage device 18 will be described below.

<Functional Blocks of Computer Device>

FIG. 3 is a functional block diagram of the computer device 2 according to the embodiment of the present invention. The functional block diagram in FIG. 3 is implemented by, for example, the CPU 11 of the computer device 2 reading the various programs stored in the storage device 18, expanding the programs in the RAM 13, and executing the programs. Note that a part or all of the units described in the functional blocks in FIG. 3 may be implemented by a program or may be implemented by a hardware circuit.

The OS 31 operates in the computer device 2, and the application 32, the printer driver 33, the store device application 34, the job combining module 35, and a communicator 36 operate on the OS 31. Further, a file named device metadata 37 is stored.

The application 32 is, for example, document creation software, spreadsheet software, or a browser (web browser), and can have created content or display content printed by the printer 3 (3A or 3B). When a print instruction is made, the application 32 generates job data (print target) for each print job in cooperation with the OS 31 and the like. The job data is data regarding a print job such as XML paper specification (XPS) data 40 or data at a previous stage of the XPS data. Note that, in the following description, the XPS data 40 will be described as an example of the job data.

Figure 4:
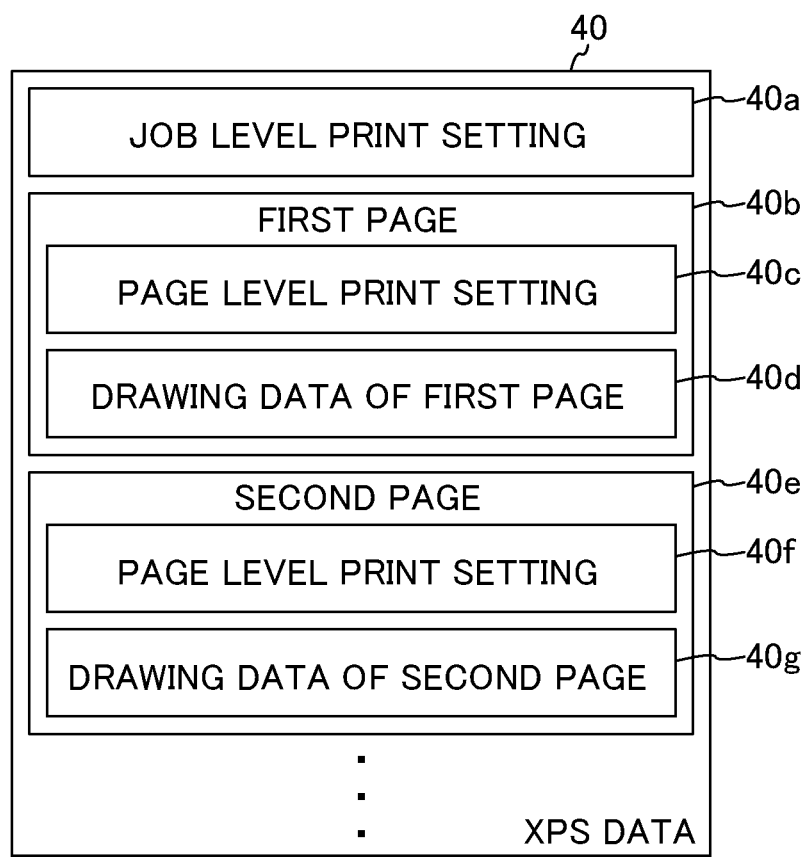
FIG. 4 is a diagram for describing XPS data that is an example of job data.

FIG. 4 is a diagram for describing the XPS data 40 as an example of the job data.

Job level print setting 40a included in the XPS data 40 is print setting (print ticket) applied to the entire XPS data 40. Data 40b of a first page includes print setting 40c applied to the first page and drawing data 40d of the first page. Data 40e of a second page includes print setting 40f applied to the second page and drawing data 40g of the second page. Similarly, data of third and subsequent pages include print setting and drawing data.

With the above configuration, a common sheet size and a common print direction can be set to the entire XPS data 40, and different sheet sizes and print directions can be set to specific pages.

Referring back to FIG. 3, the printer driver 33 is driver software for controlling the printer 3 connected to the computer device 2, and is a printer driver of Windows version 4 (V4), for example. The printer driver 33 performs drawing processing for the XPS data 40 as the job data to generate the print data. Further, the printer driver 33 can receive setting desired by the user as to whether to combine a plurality of XPS data 40.

In the present embodiment, the computer device 2 can select the first printer 3A or the second printer 3B and perform printing. Therefore, a first printer driver 33A for the first printer 3A and a second printer driver 33B for the second printer 3B are installed as the printer drivers 33 in the computer device 2.

The store device application 34 is a device companion application (DCA), and operates and displays a print setting screen unique to a printer vendor in the display device 7 in cooperation with the printer driver 33.

The job combining module 35 performs combining processing of combining the XPS data 40 to which combining has been set by the printer driver 33.

The communicator 36 controls communication performed via the communication line L. Therefore, the communication with the printer 3 is controlled via the communicator 36.

The device metadata 37 is a file that stores meta information such as the type and description of the device. The device metadata 37 associates the printer 3 and the store device application (DCA) 34 with each other by having a unique name of the application and list information of plug-and-play ID (PnP_ID) of the printer 3. When the printer 3 having the PnP_ID is connected to the computer device 2, the OS 31 generates a logical printer in association with the printer driver 33 corresponding to the PnP_ID. The logical printer is a virtual printer set between a network and a physical printer. The logical printer is generated for each printer driver and for each port, and each logical printer is identified by, for example, a printer icon.

<Printer Driver>

Next, an example of the printer driver 33 will be described. As illustrated in FIG. 3, the printer driver 33 includes a print setter 33a and a rendering unit (drawing unit) 33c.

The print setter 33a is a module for managing print setting used for printing such as number of copies, duplexing, aggregation, bookbinding, and scaling. The print setter 33a includes a display 33b that provides a setting user interface (UI) 50 (see FIG. 5) for displaying print setting to the user and receiving change in the print setting from the user.

Figure 5:
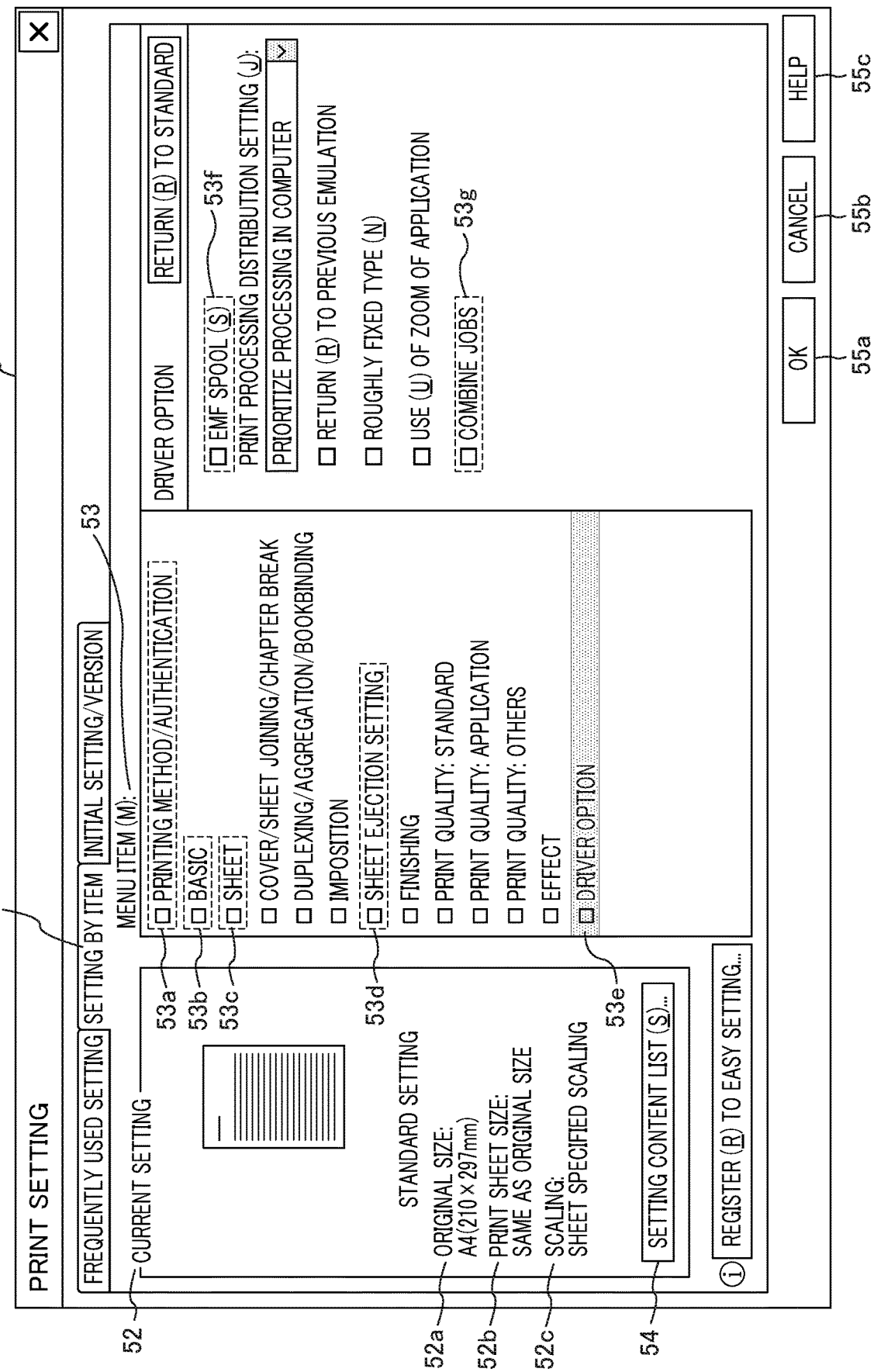
FIG. 5 is a diagram for describing a display example of a setting UI used for print setting.

FIG. 5 is a diagram illustrating an example of the setting UI 50 displayed by the display 33b of the print setter 33a.

A setting by item tab 51 is selected in the setting UI 50 exemplarily illustrated in FIG. 5. When the setting by item tab 51 is selected, current setting 52 is displayed in a left-side portion on the screen, and a menu item 53 is displayed on the right side of the current setting 52.

Current setting contents of an original size 52a, a print sheet size 52b, and scaling 52c are displayed in the current setting 52. Further, a setting content list button 54 is displayed below the scaling 52c. When the setting content list button 54 is pressed with a mouse cursor or the like (in the following description, simply described as "pressing the button"), the current setting contents are displayed in a list.

A plurality of items such as printing method/authentication 53a, basic 53b, sheet 53c, . . . , sheet ejection setting 53d, . . . , and driver option 53e is displayed in a state of being arranged in a vertical direction in the menu item 53. In the display example in FIG. 5, the driver option 53e is selected, and EMF spool 53f, combining setting of the XPS data 40 (display as to "combining jobs") 53g, and the like are displayed as small items.

The combining setting (set value) of the XPS data 40 is stored in, for example, the job level print setting 40a (see FIG. 4) of the XPS data 40. Further, a merged flag indicating that the XPS data 40 have been combined is also stored in the job level print setting 40a. In the present embodiment, the merged flag is stored after completion of combining of the XPS data 40. For example, a job data combiner 35e combines print target (job data) accumulated in a job data storage 35d and then causes combined data (merged flag) to be included in combined data.

<Rendering Unit>

Referring back to FIG. 3, the rendering unit 33c includes a determiner 33d and a drawing filter 33e. The determiner 33d is a module to determine whether to combine the XPS data (job data) 40. The drawing filter 33e is a module to convert the XPS data 40 received from the OS 31 into the print data, thereby generating the print data printable by the printer 3.

<Processing of Generating Print Data>

Figure 6:
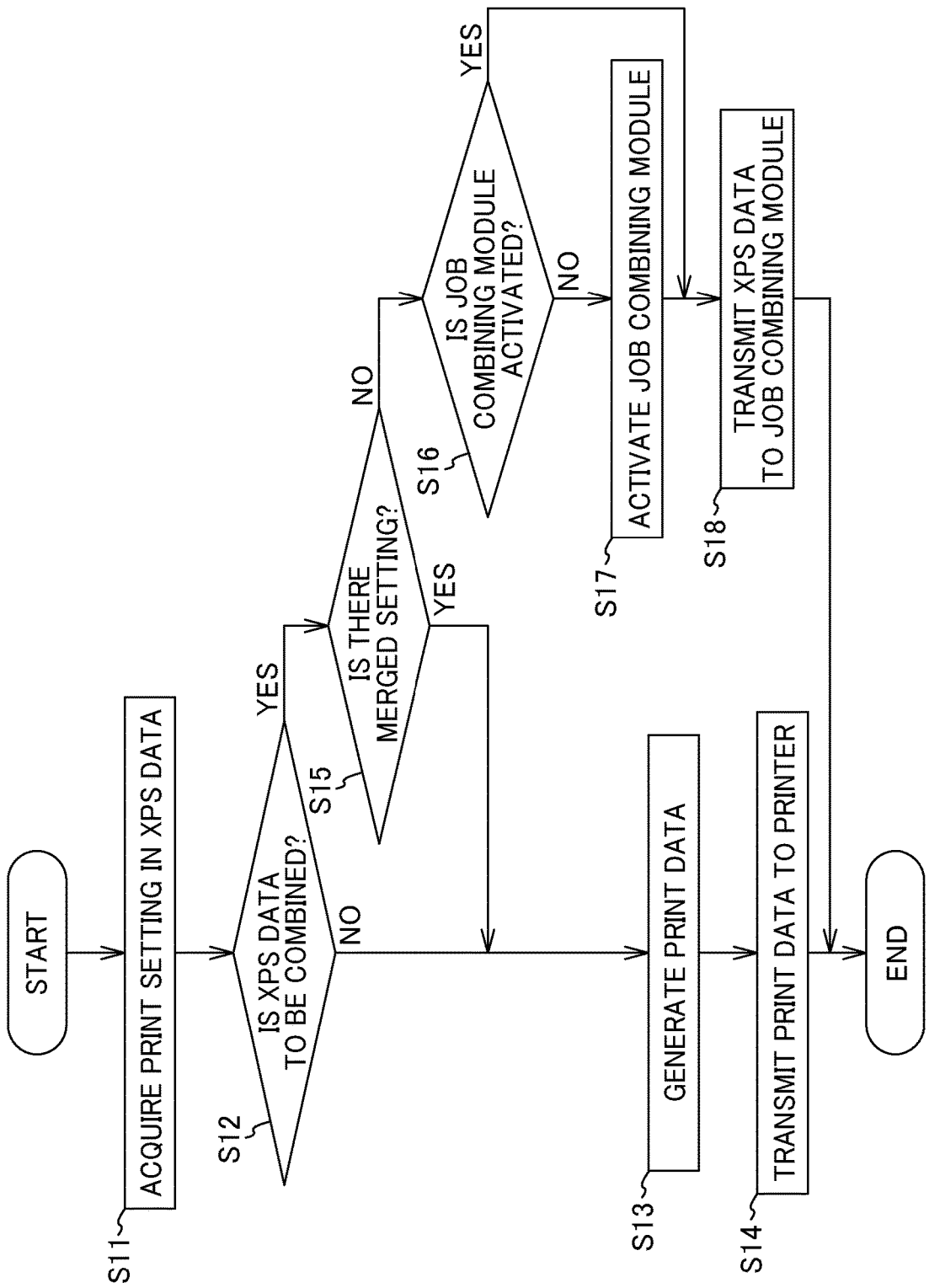
FIG. 6 is a flowchart for describing processing of generating print data by a rendering unit.

FIG. 6 is a flowchart for describing processing of generating the print data by the rendering unit 33c (the determiner 33d and the drawing filter 33e). The processing of generating the print data will be described referring to FIG. 6.

First, the rendering unit 33c acquires the job level print setting 40a in the XPS data 40 (S11). Next, the rendering unit 33c determines whether to combine the XPS data 40 on the basis of the acquired print setting 40a (S12). Specifically, the determiner 33d makes a determination on the basis of the combining setting (set value) stored in the job level print setting 40a.

In a case of determining not to combine the job data (No in S12), the rendering unit 33c generates the print data interpretable by the printer 3 (S13). For example, the rendering unit 33c converts the XPS data 40 into data in page description language (PDL) according to the print setting of the setting UI 50 to generate the print data. Next, the rendering unit 33c transmits the print data to the printer 3 in cooperation with the communicator 36 (S14).

In a case of determining to combine the XPS data 40 in step S12 (Yes in S12), the rendering unit 33c determines whether the target XPS data 40 has been combined (S15). For example, the rendering unit 33c makes a determination on the basis of whether there is information indicating merged. The rendering unit 33c determines that the target XPS data 40 has been combined in a case where the merged flag is stored in the job level print setting 40a. On the other hand, the rendering unit 33c determines that the target XPS data 40 has not been combined in a case where the merged flag is not stored in the job level print setting 40a. In the case where the target XPS data 40 has been combined (Yes in S15), the rendering unit 33c converts the XPS data 40 into data in PDL according to the print setting of the combining UI 60 (see FIG. 9 described below) to generate the print data (S13), and transmits the print data to the printer 3 (S14).

Figure 7:
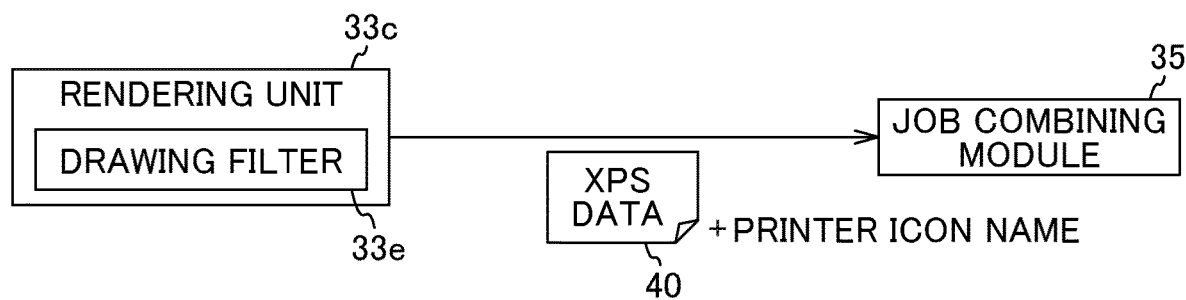
FIG. 7 is a diagram for describing a method of calling a job combining module from the rendering unit.

The rendering unit 33c determines whether the job combining module 35 is activated (S16) in a case of determining that the target XPS data 40 has not been combined (No in S15). When the job combining module 35 has not been activated (No in S16), the rendering unit 33c activates the job combining module 35 (S17). For example, as illustrated in FIG. 7, the rendering unit 33c calls a printer icon name indicating the logical printer in activating the job combining module 35. Referring back to FIG. 6, after activating the job combining module 35 in step S17, or in the case of determining that the job combining module 35 has been activated in step S16 (Yes in S16), the rendering unit 33c transmits the XPS data 40 to the job combining module 35 (S18) and terminates the series of processing.

In the case where the XPS data 40 to be combined includes the merged setting information (Yes in S15), the rendering unit 33c generates the print data (S13) and transmits the print data to the printer 3 (S14).

On the other hand, in the case where the XPS data 40 to be combined does not include the merged setting information (No in S15), the rendering unit 33c transmits the XPS data 40 to the job combining module 35 (S18) and does not generate the print data based on the XPS data 40. As a result, an inconvenience to generate the print data from the uncombined XPS data 40 is suppressed, and the print data can be generated from the XPS data 40, combining of which has been completed. Therefore, certainty of the processing can be improved.

<Job Combining Module>

Next, an example of the job combining module 35 will be described. As illustrated in FIG. 3, the job combining module 35 includes a setter 35a and a combiner 35c.

The setter 35a is a module for setting processing contents at the time of combining the XPS data 40. The setter 35a includes a display 35b that provides the combining UI 60 for receiving the request operation from the user at the time of combining the XPS data 40.

The combiner 35c is a module that stores and combines the XPS data (job data) 40 to be combined and performs print control based on the combined data (job data after combining) generated by combining. The combiner 35c includes the job data storage 35d that stores the XPS data 40 to be combined and the job data combiner 35e that combines the XPS data 40 to be combined.

<Job Data Storage>

Figure 8:
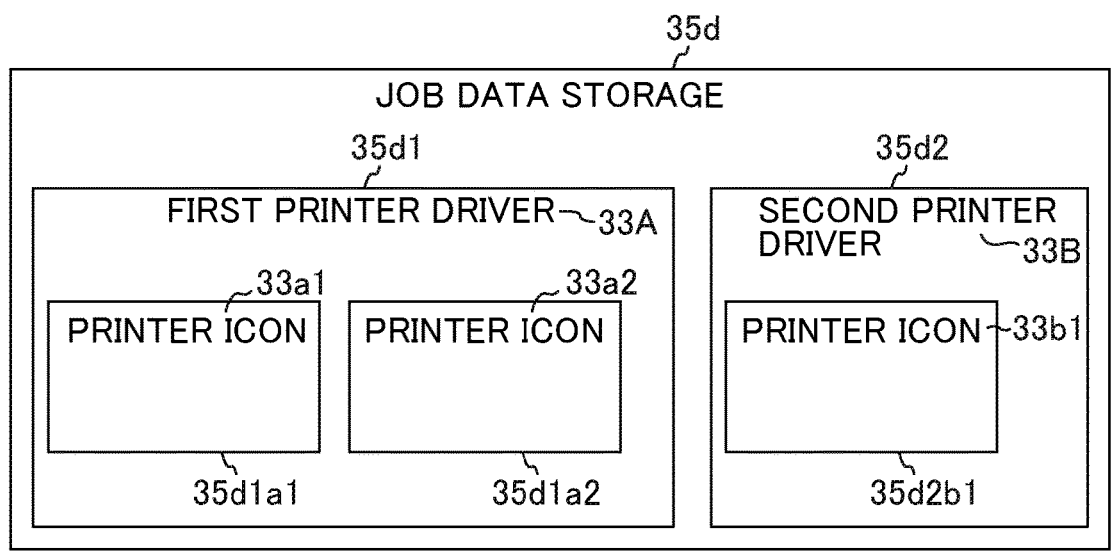
FIG. 8 is a conceptual diagram for describing a job data storage included in the job combining module.

FIG. 8 is a conceptual diagram for describing the job data storage 35d included in the job combining module 35. As illustrated in FIG. 8, the job data storage 35d can store the XPS data 40 for each printer driver 33 and for each logical printer (printer icon). In the example illustrated in FIG. 8, the job data storage 35d includes a storage area 35d1 corresponding to the first printer driver 33A and a storage area 35d2 corresponding to the second printer driver 33B. Further, the storage area 35d1 includes a storage area 35d1a1 corresponding to one logical printer of the first printer driver 33A and a storage area 35d1a2 corresponding to another logical printer. Similarly, the storage area 35d2 includes a storage area 35d2b1 corresponding to one logical printer of the second printer driver 33B. The XPS data 40 sent from the rendering unit 33c of the printer driver 33 is sorted for each printer driver and for logical printer, and is stored and accumulated in the corresponding storage areas 35d1a1, 35d1a2, and 35d2b1.

<Combining UI>

Figure 9:
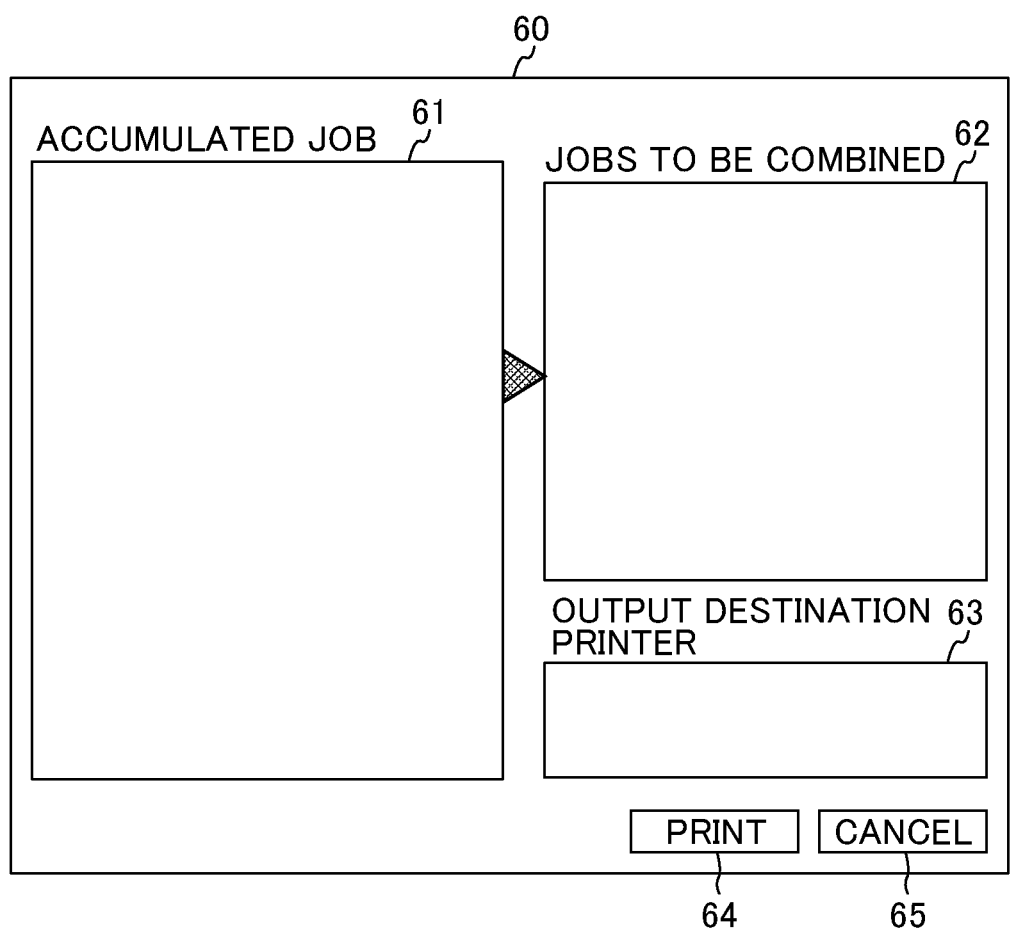
FIG. 9 is a diagram for describing a display example of a combining UI by the job combining module.

FIG. 9 is a diagram for describing a display example of a combining UI 60 by the job combining module 35. The combining UI 60 is displayed by the display 35b.

The combining UI 60 exemplified in FIG. 9 includes an accumulated data display area 61 that displays contents of the XPS data 40 accumulated in the job data storage 35d, a target data display area 62 that displays the XPS data 40 being selected as a combining target, an output destination display area 63 that specifies a logical printer to which the print data is transmitted, a print button 64 that gives an instruction for printing on the XPS data 40 displayed in the target data display area 62, and a cancel button 65 pressed when canceling combined printing using the job combining module 35.

<Specific Example of Combining and Printing of XPS Data>

Figure 10:
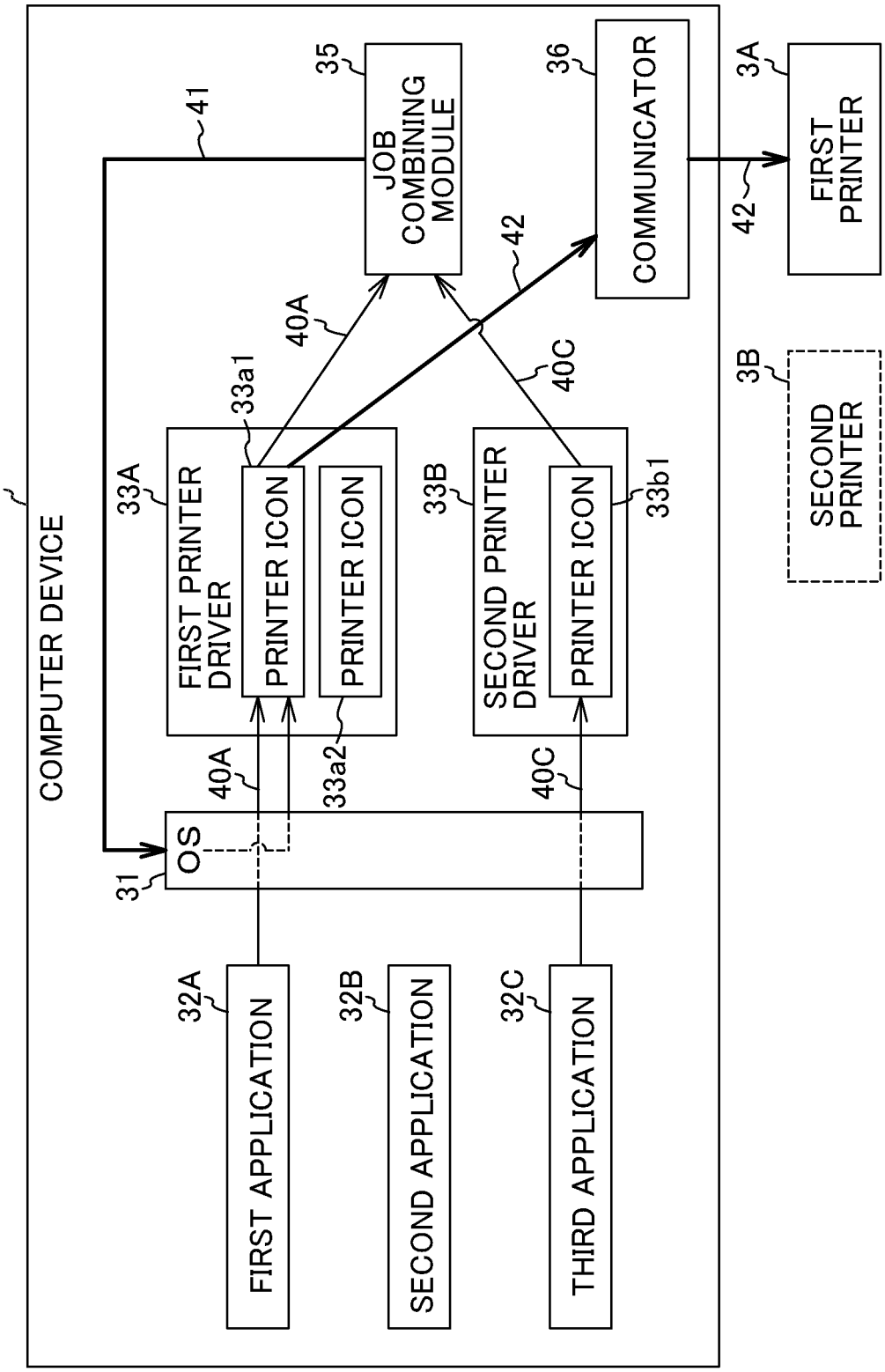
FIG. 10 is a diagram for describing a flow of processing in a case of combining a plurality of XPS data.

Next, a specific example of combining and printing of the XPS data 40 will be described. FIG. 10 is a diagram for describing a flow of processing in a case of combining a plurality of XPS data 40.

In the example illustrated in FIG. 10, a first application 32A, a second application 32B, and a third application 32C are installed as the applications 32 in the computer device 2. A printer icon 33a1 corresponding to one logical printer and a printer icon 33a2 corresponding to another logical printer are set in the first printer driver 33A for the first printer 3A. A printer icon 33b1 corresponding to one logical printer is set in the second printer driver 33B for the second printer 3B.

In this specific example, XPS data 40A regarding the print job of the first application 32A is sent to the job combining module 35 via the printer icon 33a1 of the first printer driver 33A. Similarly, XPS data 40C regarding the print job of the third application 32C is sent to the job combining module 35 via the printer icon 33b1 of the second printer driver 33B. The job combining module 35 stores and accumulates the XPS data 40A and XPS data 40C in the job data storage 35d.

<Storage of XPS Data and by Job Data Storage>

Figure 11:
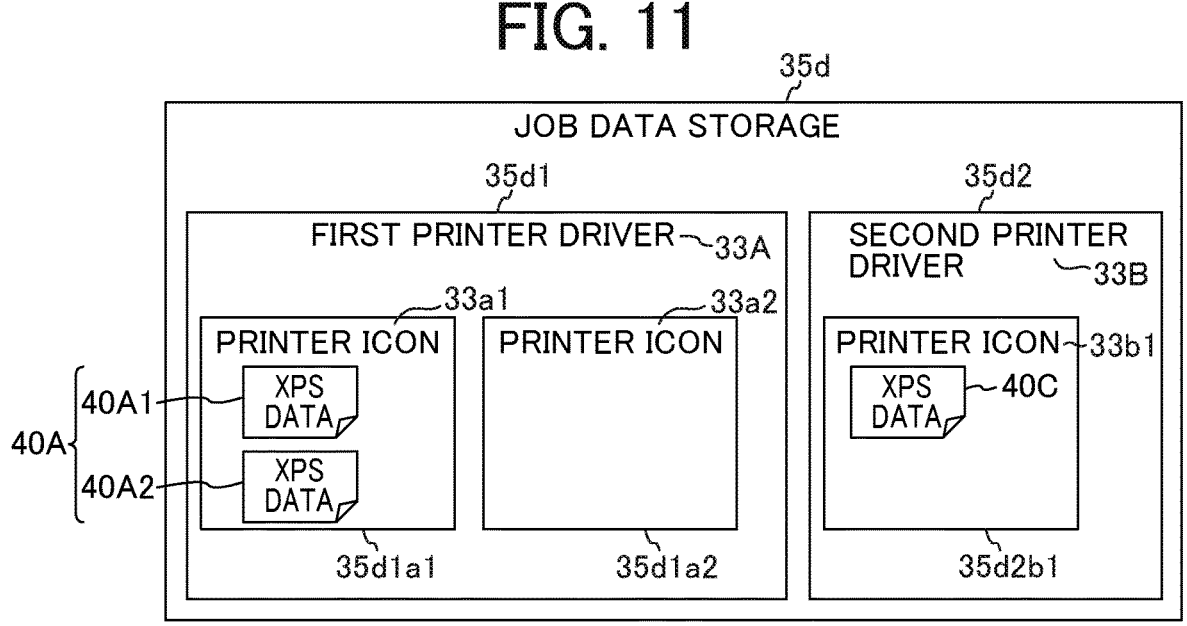
FIG. 11 is a conceptual diagram for describing storage of XPS data by the job data storage.

FIG. 11 is a conceptual diagram for describing storage of the XPS data 40A and 40C by the job data storage 35d.

As illustrated in FIG. 11, the XPS data 40A is stored in a storage area 35d1a1 corresponding to one logical printer (printer icon 33a1) of the first printer driver 33A. In this specific example, the XPS data 40A includes XPS data 40A1 generated by one print job and XPS data 40A2 generated by another print job. The XPS data 40C is stored in the storage area 35d2b1 corresponding to one logical printer (printer icon 33b1) of the second printer driver 33B.

<Selection Example of XPS Data by Combining UI>

Figure 12:
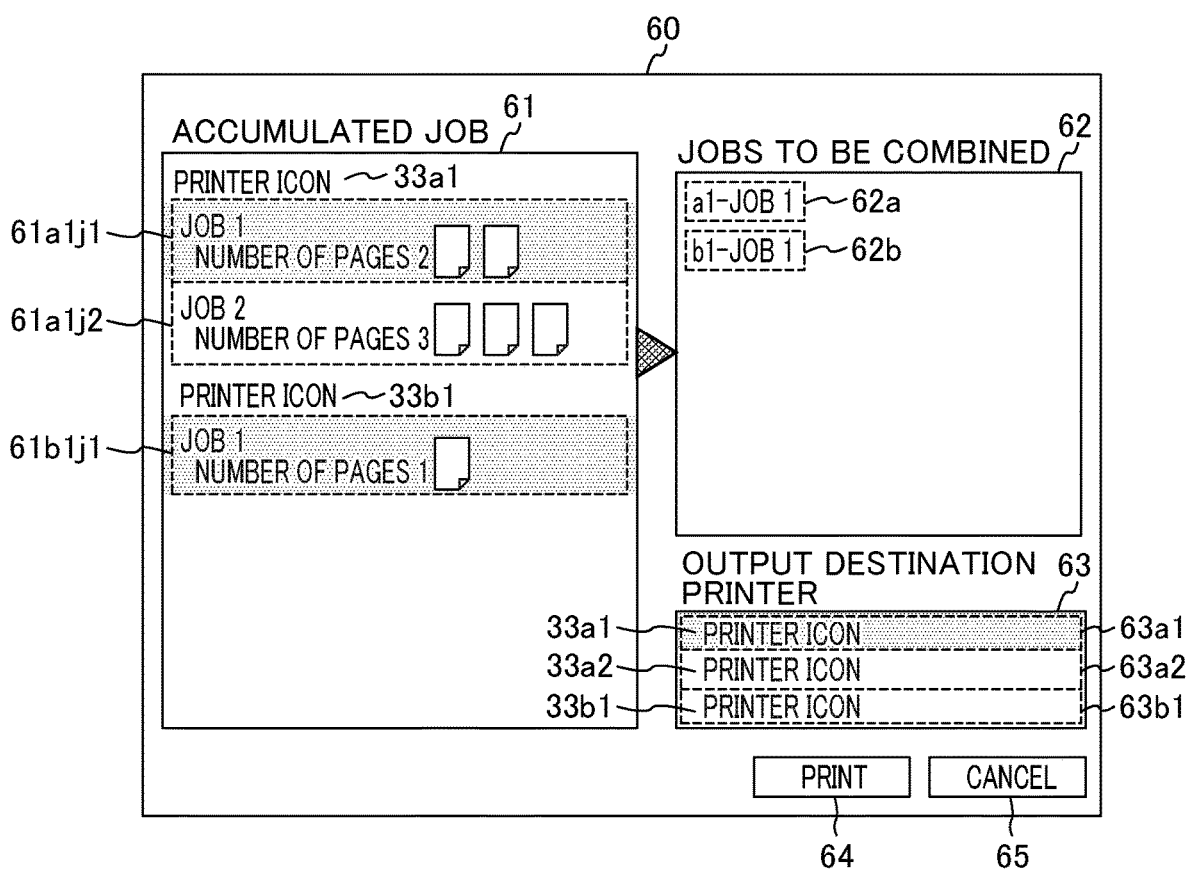
FIG. 12 is a diagram for describing a selection example of XPS data by the combining UI.

FIG. 12 is a diagram for describing a selection example of the XPS data 40 by the combining UI 60. A job display 61a1j1 corresponding to the XPS data 40A1, a job display 61a1j2 corresponding to the XPS data 40A2, and a job display 61b1j1 corresponding to the XPS data 40C in FIG. 11 are displayed in the accumulated data display area 61 of the combining UI 60.

The job display 61a1j1 indicates that the job display 61a1j1 corresponds to the XPS data 40A1 regarding a first job of the printer icon 33a1 and the number of pages is 2. The job display 61a1j2 indicates that the job display 61a1j2 corresponds the XPS data 40A2 regarding a second job of the printer icon 33a1 and the number of pages is 3. The job display 61b1j1 indicates that the job display 61b1j1 corresponds to the XPS data 40C regarding a first job of the printer icon 33b1 and the number of pages is 3.

In addition, the job display 61a1j1 and the job display 61b1j1 are displayed in a specific mode different from a normal operating mode in ground color and character color. The display in the specific mode indicates that the job display 61a1j1 and the job display 61b1j1 are being selected as jobs to be combined. With the display, "a1-job1" is displayed as display being selected 62a and "b1-job1" is displayed as display being selected 62b in the target data display area 62.

A first output destination display 63a1 indicating that the logical printer to serve as the output destination of the print data is the printer icon 33a1, a second output destination display 63a2 indicating that the logical printer to serve as the output destination is the printer icon 33a2, and a third output destination display 63b1 indicating that the logical printer to serve as the output destination is the printer icon 33b1 are displayed in the output destination display area 63.

The first output destination display 63a1 is displayed in a specific mode different from the normal operating mode in ground color and character color. The display in the specific mode indicates that the first output destination display 63a1 (printer icon 33a1) is being selected as the output destination of the print data.

In the above state, when the print button 64 is pressed by an operation from the user, the job combining module 35 (job data combiner 35e) combines the XPS data 40A1 and the XPS data 40C and generates combined data (XPS data 40 after combining) 41. The combined data 41 corresponds to the job data (job data after combining) like the XPS data 40.

<Configuration of Combined Data>

Figure 13:
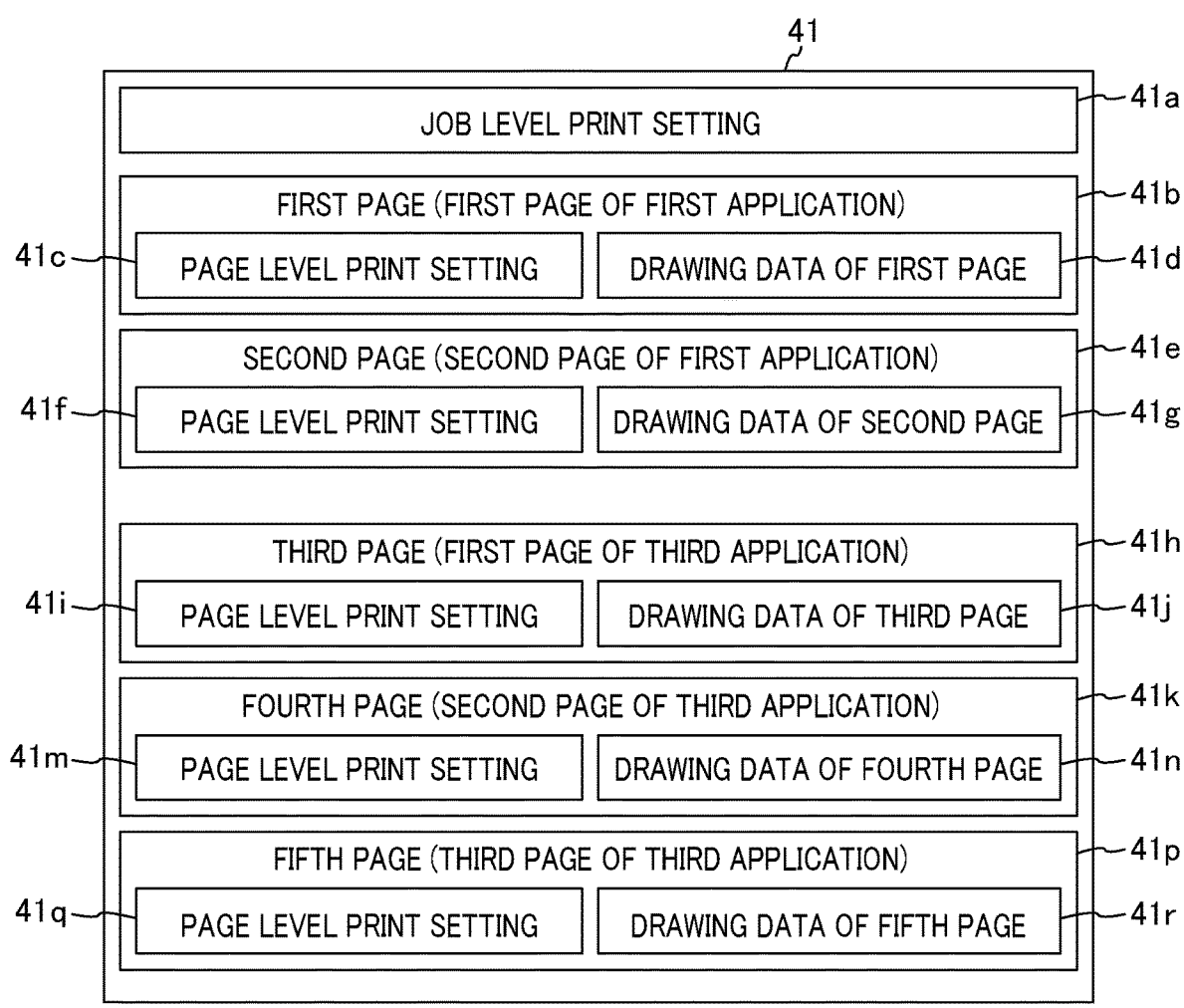
FIG. 13 is a conceptual diagram for describing a configuration of combined data.

FIG. 13 is a conceptual diagram for describing a configuration of the combined data 41. Job level print setting 41a included in the combined data 41 is print setting (print ticket) applied to the entire combined data 41. Information of the logical printer (logical printer specified in the output destination display area 63) used for printing the combined data 41 is stored in the job level print setting 41a. Further, the merged flag indicating that the XPS data 40 has been combined is also stored in the job level print setting 41a.

Data 41b of the first page includes print setting 41c applied to the first page and drawing data 41d of the first page. In this specific example, the first page of the combined data 41 corresponds to the first page of the first application 32A. Data 41e of the second page includes print setting 41f applied to the second page and drawing data 41g of the second page. In this specific example, the second page of the combined data 41 corresponds to the second page of the first application 32A. Data 41h of the third page includes print setting 40i applied to the third page and drawing data 40j of the third page. In this specific example, the third page of the combined data 41 corresponds to the first page of the third application 32C. Data 41k of the fourth page includes print setting 40m applied to the fourth page and drawing data 40n of the fourth page. In this specific example, the fourth page of the combined data 41 corresponds to the second page of the third application 32C. Data 41p of the fifth page includes print setting 40q applied to the fifth page and drawing data 40r of the fifth page. In this specific example, the fifth page of the combined data 41 corresponds to the third page of the third application 32C.

As is clear from the above description, the combined data 41 includes the XPS data 40A1 regarding the print job of the first application 32A and the XPS data 40C regarding the print job of the third application 32C.

<Printing by Combined Data>

Referring back to FIG. 10, the combined data 41 generated by the job combining module 35 is output to the OS 31. The OS 31 outputs the combined data to the corresponding printer driver 33 on the basis of the information of the logical printer stored in the job level print setting 41a of the combined data 41. In this specific example, the printer icon 33a1 is selected as the output destination of the combined data 41. Therefore, the OS 31 outputs the combined data 41 to the printer icon 33a1 of the first printer driver 33A.

The first printer driver 33A converts the combined data 41 into data in PDL according to the print setting of the combining UI 60 (see FIG. 6) to generate print data 42. Then, the first printer driver 33A transmits the print data 42 to the first printer 3A in cooperation with the communicator 36.

As a result, in the first printer 3A, printing based on the print data 42 is performed, and a document created by the first application 32A and a document created by the third application 32C are collectively printed.

<Case of not Combining XPS Data>

A case of combining a plurality of XPS data 40 has been described as an example. Next, a case of not combining the XPS data 40 will be described. FIG. 14 is a diagram for describing a flow of processing in a case of not combining the XPS data 40.

In the specific example illustrated in FIG. 14, the configuration of the computer device 2 is the same as the configuration described referring to FIG. 10, so the description is omitted.

In this specific example, the XPS data 40B regarding the print job of the second application 32B is output to the printer icon 33a2 of the first printer driver 33A. The first printer driver 33A generates print data 42' on the basis of the XPS data 40B because there is no setting of combining the XPS data 40B. The first printer driver 33A transmits the print data 42' to the first printer 3A in cooperation with the communicator 36.

In this way, the computer device 2 can also transmit the print data regarding the print target (job data) determined not to be a target to be combined by the rendering unit 33c to the printing device (printer 3).

<Sequence of Print Processing>

Figure 15B:
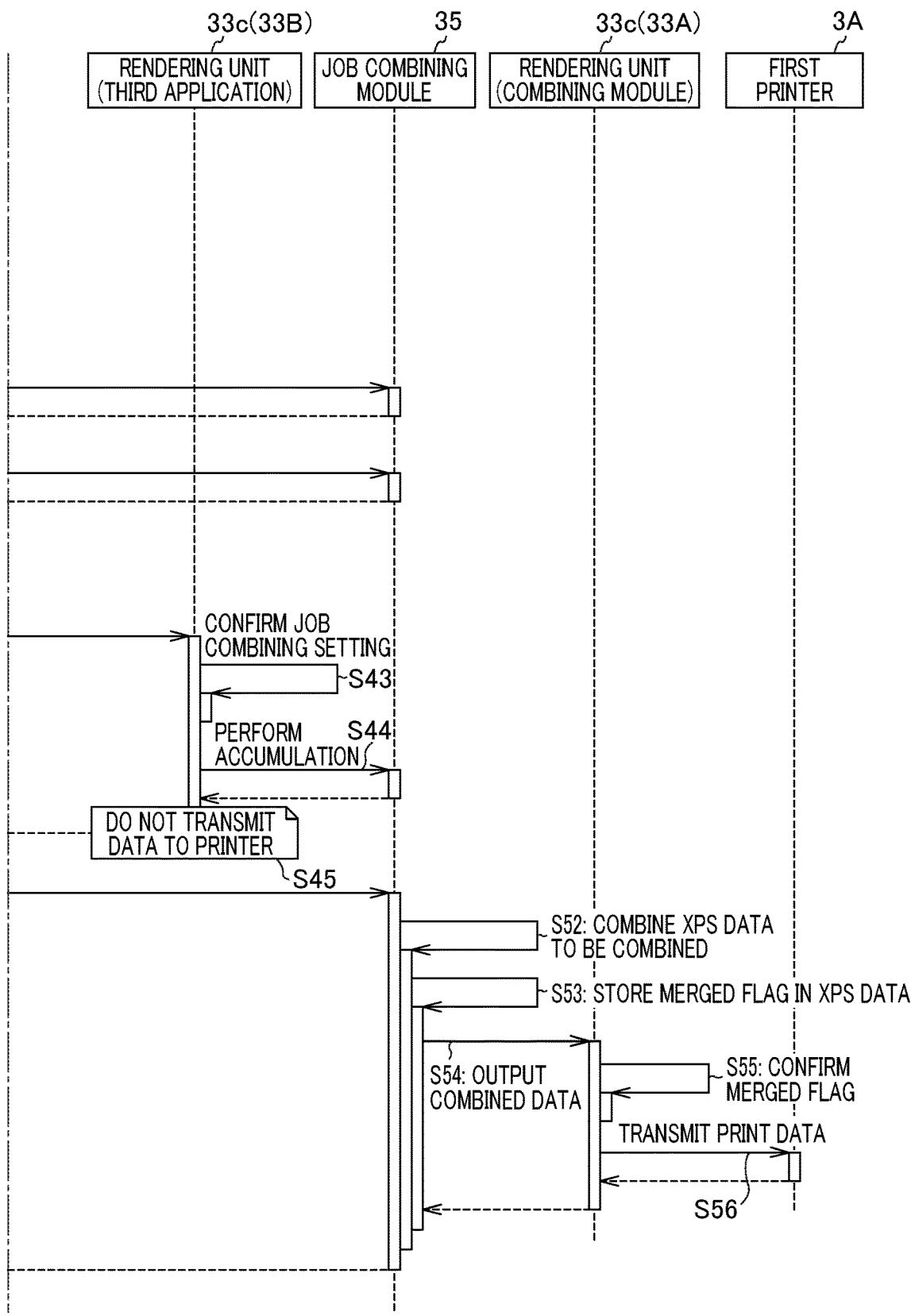

Next, a sequence of the print processing will be described. FIG. 15 is a sequence diagram of print processing in a case of combining XPS data. Note that the sequence in FIG. 15 corresponds to the specific example described referring to FIG. 10. That is, a case of combining the XPS data 40A1 regarding the first application 32A and the XPS data 40C regarding the third application 32C to generate the combined data 41, and outputting the print data 42 based on the combined data 41 to the first printer 3A by the sequence in FIG. 15 will be described. Further, the OS 31 is omitted in the sequence in FIG. 15.

When the first application 32A receives the print instruction from the user (S21), the first application 32A requests the print setter 33a of the first printer driver 33A to display a print setting screen (S22). The display 33b of the print setter 33a displays the setting UI 50 on the display device 7 in response to the display request.

When the print instruction from the user is received after the setting UI 50 sets the combining of the XPS data 40 (S31), the XPS data 40A is output from the first application 32A to the rendering unit 33c of the first printer driver 33A. The rendering unit 33c confirms the combining setting stored in the job level print setting 40a of the XPS data 40A (S32) and recognizes that the XPS data 40A is the data to be combined.

Since the job combining module 35 is not activated at the time of confirming the combining setting, the rendering unit 33c activates the job combining module 35 (S33). The setter 35a of the job combining module 35 displays the combining UI 60 on the display device 7 with the activation. After the job combining module 35 is activated, the rendering unit 33c accumulates the XPS data 40A in the storage area 35d1a1 of the job data storage 35d (S34).

Since the XPS data 40A is data to be combined, the rendering unit 33c does not transmit the print data based on the XPS data 40A to the first printer 3A (S35). Then, the rendering unit 33c transmits termination notification to the first application 32A (S36).

When the third application 32C receives the print instruction from the user (S41), the XPS data 40C is output from the third application 32C to the rendering unit 33c of the second printer driver 33B (S42). The rendering unit 33c confirms the combining setting stored in the job level print setting 40a of the XPS data 40C (S43) and recognizes that the XPS data 40C is the data to be combined.

Since the job combining module 35 has already been activated at the time of confirming the combining setting, the rendering unit 33c accumulates the XPS data 40C in the storage area 35d2b1 of the job data storage 35d (S44).

Since the XPS data 40C is data to be combined, the rendering unit 33c does not transmit the print data based on the XPS data 40C to the second printer 3B (S45). Then, the rendering unit 33c transmits termination notification to the third application 32C (S46). Next, the print instruction of the combined data is performed (S51). For example, the user specifies the XPS data 40A and 40C to be combined via the combining UI 60, specifies the printer 3A as the output destination, and then presses the print button 64 of the combining UI 60.

When receiving the print instruction from the user, the job combining module 35 starts printing processing similar to steps S31 and S42 above, and combines the XPS data 40A1 and 40C to be combined to generate the combined data 41 (S52). Thereafter, the job combining module 35 stores the merged flag in the job level print setting 41a of the combined data 41 (S53).

The job combining module 35 outputs the combined data 41 (S54), and the rendering unit 33c of the first printer driver 33A confirms the merged flag stored in the job level print setting 41a of the combined data 41 (S55).

Since the merged flag is stored in the combined data 41, the rendering unit 33c generates the print data 42 on the basis of the combined data 41 and transmits the generated print data 42 to the first printer 3A (S56).

In the printing system 1 according to the present embodiment, the rendering unit 33c of the printer driver 33 determines whether the job data such as the XPS data 40 is to be the target to be combined. The job data storage 35d of the job combining module 35 accumulates the XPS data 40 determined to be the target to be combined by the rendering unit 33c. The job data combiner 35e of the job combining module 35 generates the combined data 41 obtained by combining the XPS data 40 accumulated in the job data storage 35d on the basis of pressing (printing request) of the print button 64 in the combining UI 60. Note that the combined data 41 includes the merged flag (combined data) indicating having been combined.

The rendering unit 33c and the communicator 36 transmit the print data 42 (print data regarding the combined data) obtained by converting the combined data 41 into data in PDL to the first printer 3A (printing device).

Therefore, even in the case where a port monitor unique to a printer vendor cannot be set, the combining function of the XPS data 40 (job data) can be implemented in the printing system 1.

Further, the rendering unit 33c determines whether the print target (job data) is to be the target to be combined on the basis of the set data (the set value indicating "combining jobs") settable by the user. Therefore, the certainty of the processing can be enhanced.

Note that the print target is data regarding a print job (the XPS data 40, data in the previous stage of the XPS data 40).

In an embodiment, the job data combiner 35e is included in a software module (job combining module 35) different from a software module (printer driver 33) that converts the combined data into the print data. Therefore, the job data combiner 35e can be shared by the plurality of software modules that converts the combined data into the print data.

In another embodiment, the job data combiner 35e may be included in a software module (printer driver 33) that converts the combined data into the print data.

<Modification>

In the above embodiment, the job combining module 35 has been separately provided from the printer driver 33, as illustrated in FIG. 3. This configuration has an advantage that the plurality of printer drivers 33 (33A and 33B) can share the job combining module 35.

Figure 16:
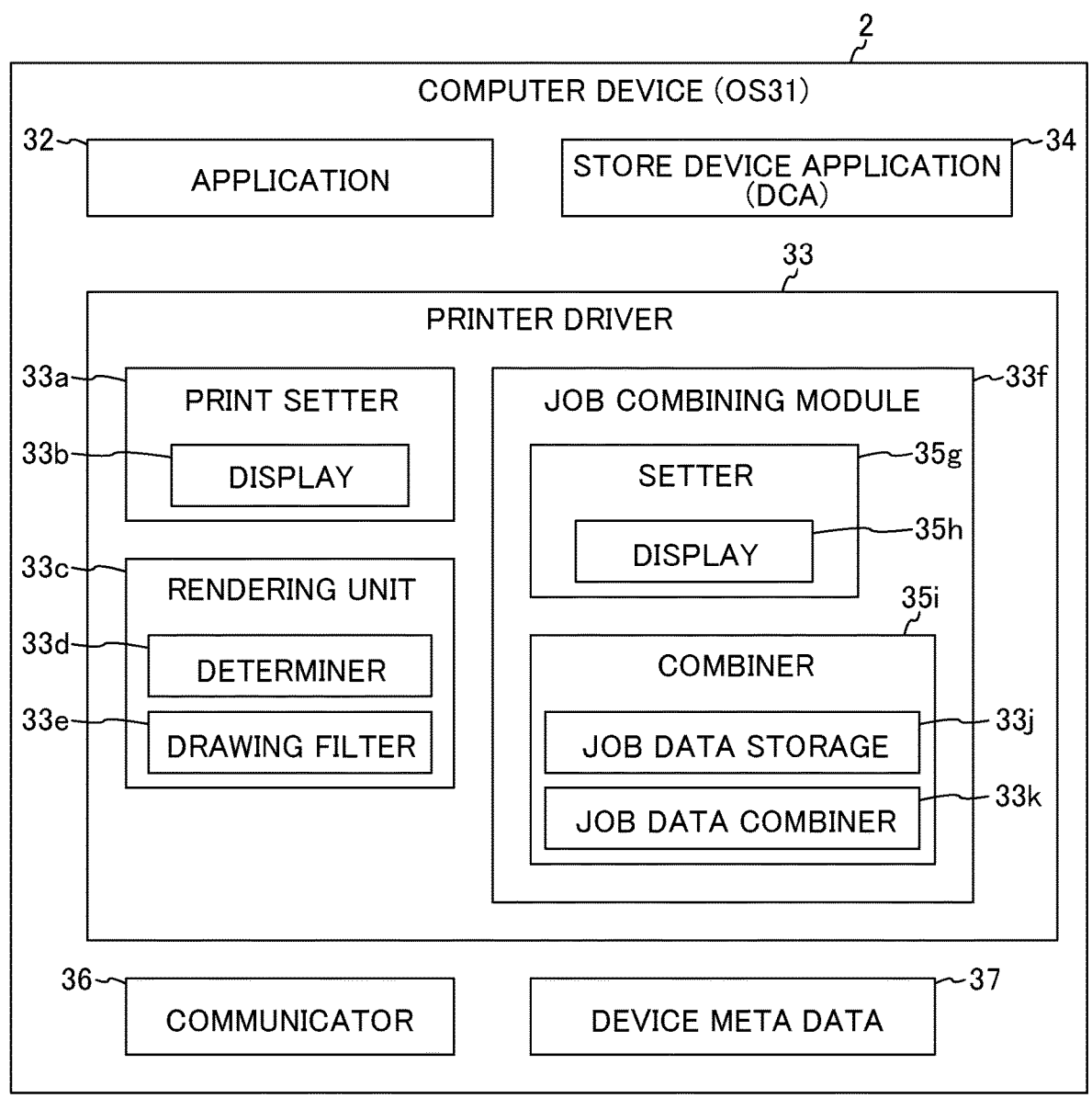
FIG. 16 is a functional block diagram of a computer device according to a modification.
Figure 17:
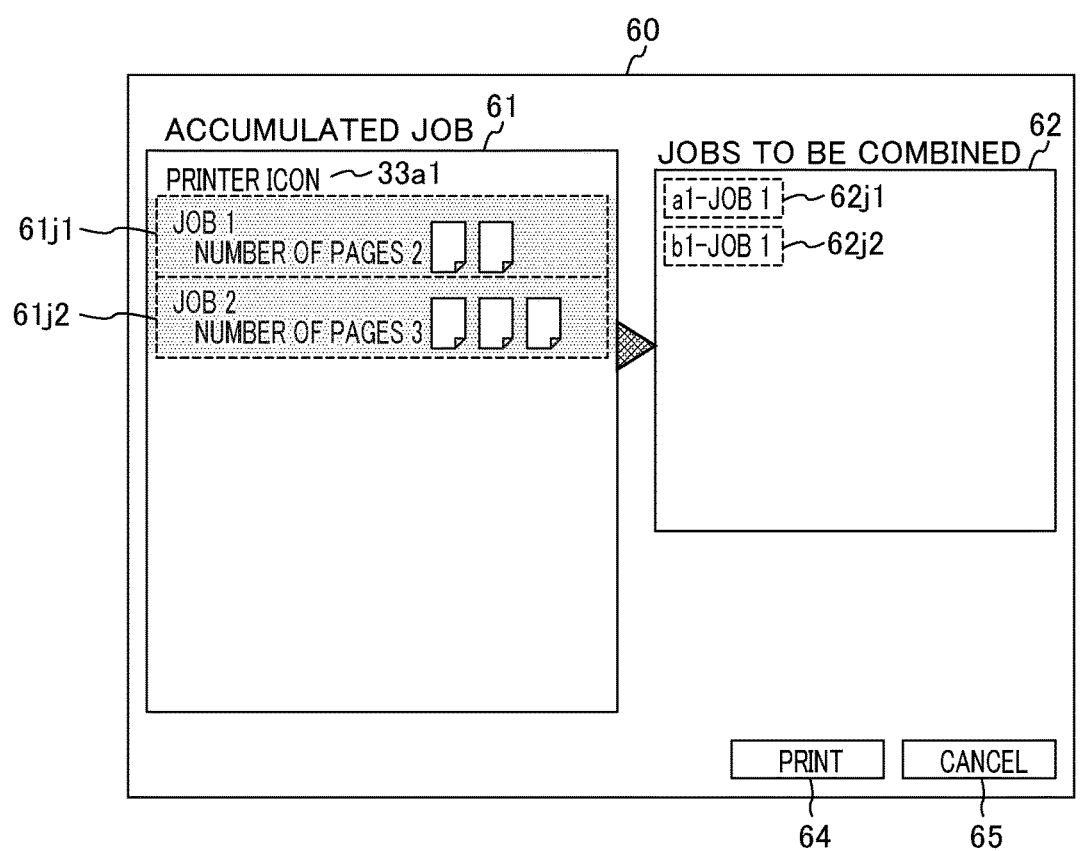
FIG. 17 is a diagram for describing a display example of a combining UI according to the modification.

However, the printing system 1 is not limited to this configuration. Here, FIG. 16 is a functional block diagram of a computer device 2 according to a modification. FIG. 17 is a diagram for describing a display example of a combining UI 60 according to the modification.

As illustrated in FIG. 16, a job combining module 33f (a setter 33g, a display 33h, a combiner 33i, a job data storage 33j, and a job data combiner 33k) may be included in a printer driver 33.

In this case, as illustrated in FIG. 17, job displays 61j1 and 61j2 converted by the printer driver 33 are displayed in an accumulated data display area 61 of the combining UI 60. Similarly, currently selected displays 62j1 and 62j2 are displayed in target data display area 62.

A function to combine XPS data 40 (job data) can be implemented in this modification, similarly to the above-described embodiment.

In the above-described embodiment, the XPS data 40 has been exemplified as the print target. However, the print target is not limited to the XPS data 40. For example, the print target may be job data specified by a print job, such as data in a previous stage of the XPS data 40.

In the above-described embodiment, the determination as to whether the XPS data 40 is to be a target to be combined has been made according to the setting value corresponding to the combining setting 53g of the XPS data 40. However, the embodiment is not limited to this configuration. The determination may be made on the basis of another piece of information.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An information processing device comprising:
processing circuitry configured to,
determine whether data to be printed is to be a target to be combined,
based on determining that the data to be printed is the target to be combined and that combined information indicates that the data has not been combined, accumulate in a memory the data to be printed,
combine the accumulated data to be printed to generate combined data in response to a print request, and
update the combined information to indicate that the data to be printed has been combined,
generate print data from the combined data in response to the combined information indicating that the data to be printed has been combined, and
transmit the print data to a printing device.

2. The information processing device according to claim 1,
 wherein the combined information is included in the combined data after the data to be printed is combined, and
 the processing circuitry determines whether the combination information is included in the combined data, and
 controls not to transmit the print data to the printing device, based on a determination that the combined information is not included in the combined data.

3. The information processing device according to claim 2,
 wherein the processing circuitry transmits the print data determined not to be the target to be combined to the printing device, irrespective of the determination.

4. The information processing device according to claim 1,
 wherein the data to be printed is data relating to a print job.

5. The information processing device according to claim 1,
 wherein the processing circuitry determines whether the data to be printed is to be the target to be combined based on setting data settable by a user.

6. The information processing device according to claim 1,
 wherein the processing circuitry operates in cooperation with a software module to generate the combined data, the software module being different from a software module that converts the combined data into the print data.

7. The information processing device according to claim 1,
 wherein the processing circuitry operates in cooperation with a software module that converts the combined data into the print data, to generate the combined data.

8. An information processing method comprising:
 determining whether data to be printed is to be a target to be combined;
 based on determining that the data to be printed is the target to be combined and that combined information indicates that the data has not been combined,
 accumulating in a memory the data to be printed,
 combining the data to be printed to generate combined data in response to a print request, and
 updating the combined information to indicate that the data to be printed has been combined;
 generating print data from the combined data in response to the combined information indicating that the data to be printed has been combined; and
 transmitting the print data to a printing device.

9. The information processing method according to claim 8, wherein the combined information is included in the combined data after the data to be printed is combined, the method further comprising:
 determining whether the combination information is included in the combined data; and
 controlling not to transmit the print data to the printing device, based on a determination that the combined information is not included in the combined data.

10. The information processing method according to claim 9, further comprising:
 transmitting the print data determined not to be the target to be combined to the printing device, irrespective of the determination.

11. The information processing method according to claim 8,
 wherein the data to be printed is data relating to a print job.

12. The information processing method according to claim 8,
 wherein the determining determines whether the data to be printed is to be the target to be combined based on setting data settable by a user.

13. The information processing method according to claim 8,
 wherein the combining to generate the combined data is performed by processing circuitry that operates in cooperation with a software module different from a software module that converts the combined data into the print data.

14. A non-transitory recording medium storing a plurality of instructions which, when executed by one or more processors, cause the processors to perform an information processing method comprising:
 determining whether data to be printed is to be a target to be combined;
 based on determining that the data to be printed is the target to be combined and that combined information indicates that the data has not been combined,
 accumulating in a memory the data to be printed by the determining,
 combining the data to be printed to generate combined data in response to a print request, and
 updating the combined information to indicate that the data to be printed has been combined;
 generating print data from the combined data in response to the combined information indicating that the data to be printed has been combined; and
 transmitting the print data to a printing device.

15. The recording medium according to claim 14, wherein the combined information is included in the combined data after the data to be printed is combined, the method further comprising:
 determining whether the combination information is included in the combined data; and
 controlling not to transmit the print data to the printing device, based on a determination that the combined information is not included in the combined data.

16. The recording medium according to claim 15, further comprising:
 transmitting the print data determined not to be the target to be combined to the printing device, irrespective of the determination.

17. The recording medium according to claim 14,
 wherein the data to be printed is data relating to a print job.

18. The recording medium according to claim 14,
 wherein the determining determines whether the data to be printed is to be the target to be combined based on setting data settable by a user.

19. The recording medium according to claim 14,
 wherein the combining to generate the combined data is performed by processing circuitry that operates in cooperation with a software module different from a software module that converts the combined data into the print data.

20. The recording medium according to claim 14,
 wherein the combining to generate the combined data is performed by processing circuitry that operates in cooperation with a software module that converts the combined data into the print data.

* * * * *